No. 753,402.

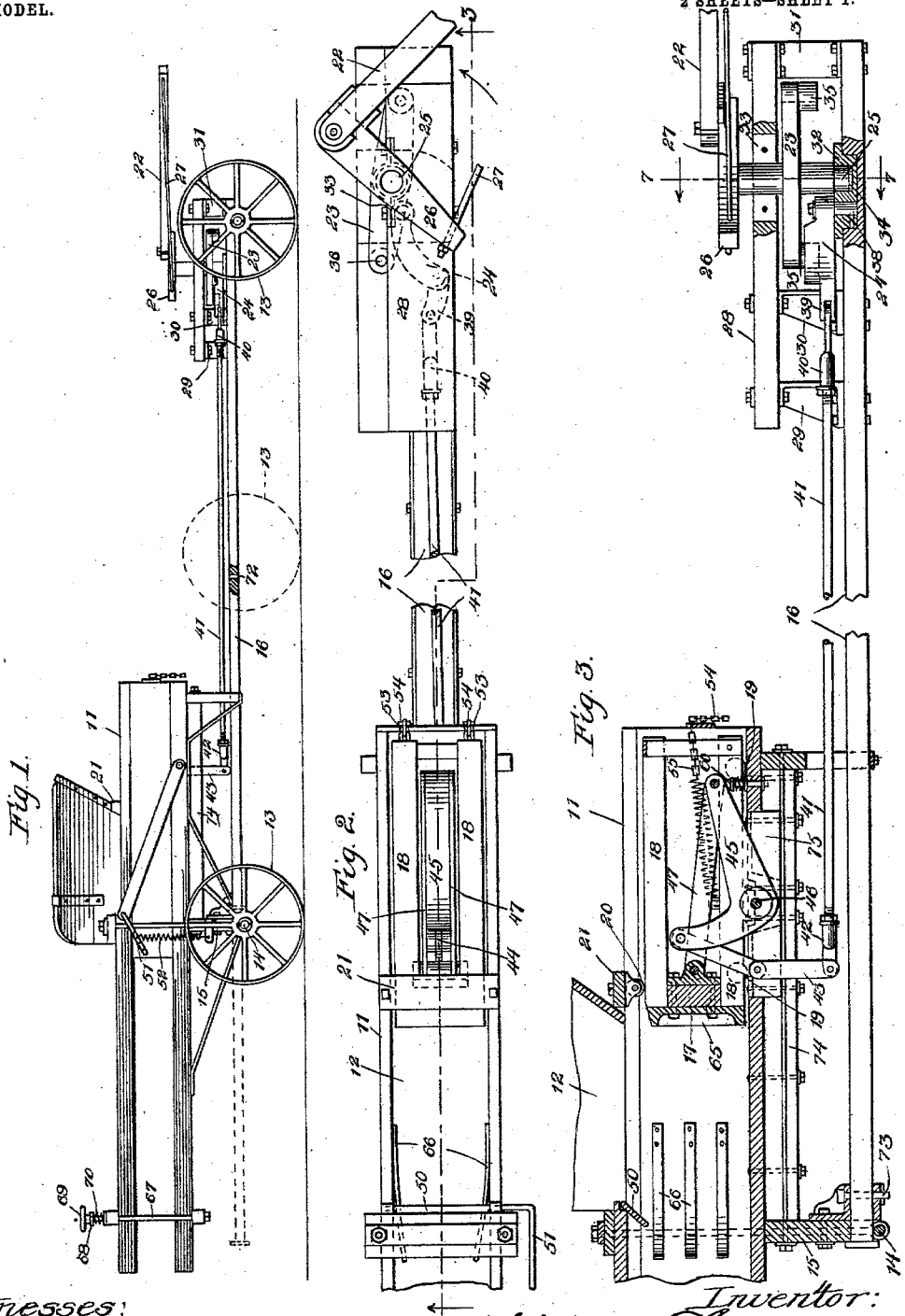

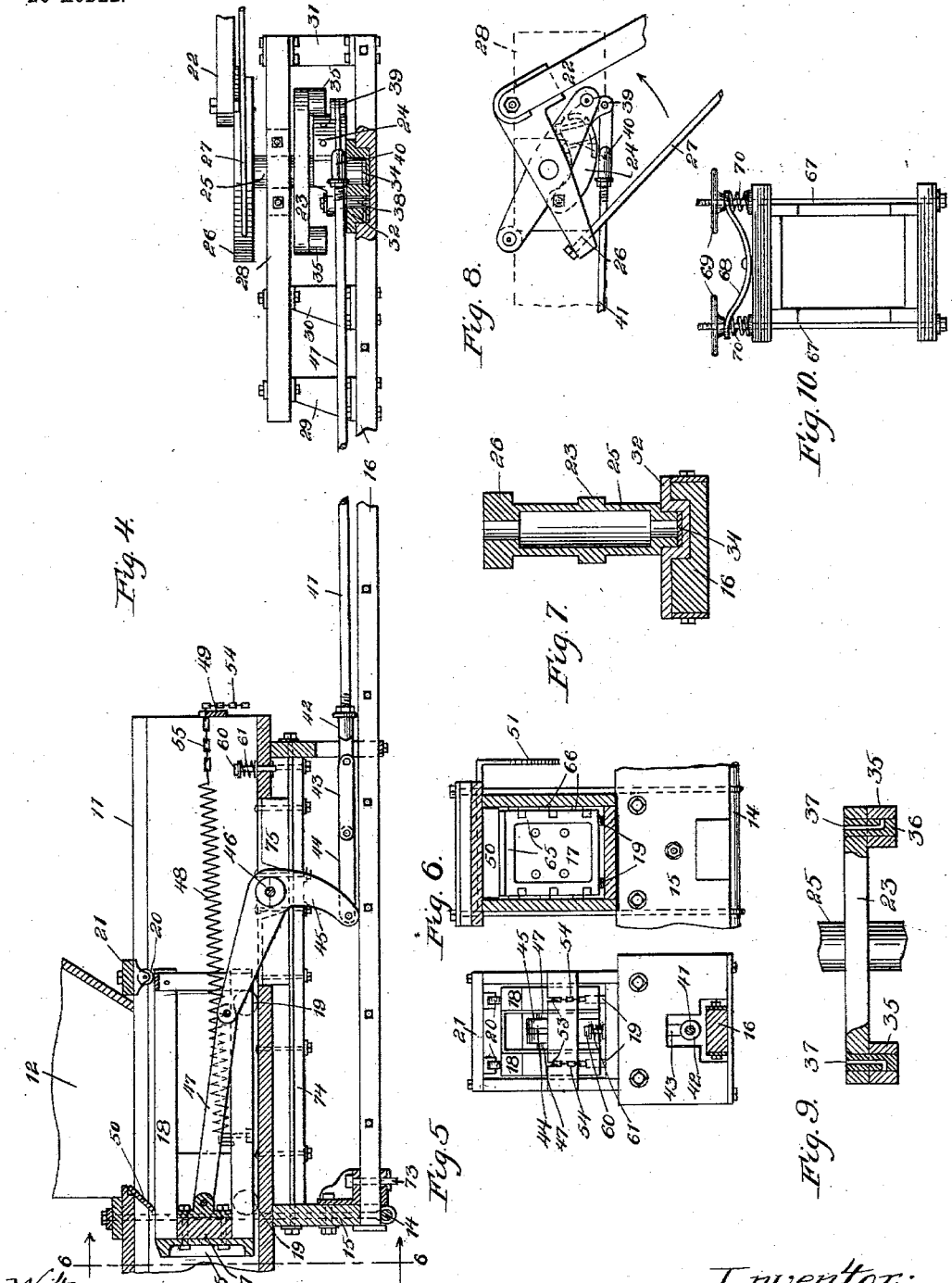

Patented March 1, 1904.

UNITED STATES PATENT OFFICE.

WILLIAM F. JACOBS, OF OTTAWA, ILLINOIS, ASSIGNOR TO J. E. PORTER COMPANY, OF OTTAWA, ILLINOIS, A CORPORATION OF ILLINOIS.

BALING-PRESS.

SPECIFICATION forming part of Letters Patent No. 753,402, dated March 1, 1904.

Application filed April 19, 1902. Serial No. 103,763. (No model.)

*To all whom it may concern:*

Be it known that I, WILLIAM F. JACOBS, a citizen of the United States, residing in Ottawa, in the county of Lasalle and State of Illinois, have invented a new and useful Improvement in Baling-Presses, of which the following is a specification.

This invention relates to the construction of hay-presses of the general character set forth in the patent to Heaston, No. 627,460, of June 20, 1899, and is an improvement upon the presses of this kind heretofore used.

The invention is designed to overcome some of the objections to which the former constructions are subject and to simplify the press and render it easy of manipulation and but little likely to get out of order; and it consists in the novel combinations of parts and devices and the novel constructions of parts and devices hereinafter described.

In the drawings, Figure 1 is a side elevation, and Fig. 2 a plan, of my improved press. Figs. 3 and 4 are longitudinal vertical sections on the line 3 3 of Fig. 2, the former showing the parts in the position to receive the hay to be baled and the latter showing the same at the conclusion of the pressing operation. Fig. 5 is a transverse vertical section. Fig. 6 is a section on the line 6 6 of Fig. 4. Fig. 7 is a section on the line 7 7 of Fig. 3. Fig. 8 is a plan of the power mechanism. Fig. 9 is a detail section of a portion of the power mechanism, and Fig. 10 is a rear elevation of the press.

In said drawings, 11 represents the trunk or baling-chamber, provided with an opening 12 in its top for the introduction of the material to be baled and supported from the wheels 13 by the axle 14 and bolster 15 and from the coupling-beam 16. The plunger 17, by which the bale is compressed, is provided with a forwardly-extending frame 18 and reciprocates within the trunk, as described below, and is supported upon rollers 19, whereby its movements are rendered comparatively free from friction. Rollers 20, attached to the top crossbrace 21, are also employed to hold the plunger down upon the floor of the trunk.

The power mechanism consists of a sweep 22, a roller-arm 23, a cam-arm 24, operated by the roller-arm and adapted to give motion to the plunger through the medium of the connections hereinafter described, and a shaft 25. The sweep is attached to one end of a cross-bar 26, mounted rigidly on the shaft 25 and braced therefrom in the usual manner by brace 27. The shaft is stepped at the bottom in a lateral enlargement of the coupling-beam and is steadied above by a framework consisting of a horizontal plate 28 and uprights 29, 30, and 31, supporting plate 28 from the beam. A metal plate 32 is let into the beam and forms the lower bearing for the shaft and is recessed to receive the same, as clearly shown by the broken-away portion of Fig. 3, and a metal box 33 is preferably provided in the plate 28. A loose washer 34 is inserted in the recess in plate 32 below the shaft and sustains the weight of the shaft and is readily replaced whenever it becomes too much worn.

The rollers 35 at the ends of the arm 23 are provided with pivots 36, which are drilled vertically from the top and also from the side, forming L-shaped passages 37, adapted to convey the oil to the inside of the rollers. The shaft 25 for convenience in oiling its bearing in plate 32 is made hollow from end to end, as plainly seen at Fig. 7.

The sweep rotates shaft 25 and carries the rollers 35 alternately against the cam-arm 24, which is pivoted on the stud 38, and the rollers travel along the vertical face of the arm and at the same time force the arm to swing on its pivot from the position indicated at Fig. 2 to that given at Fig. 8. During the movement of the cam-arm from the first to the second of these positions the bale is formed, and the power therefor is transmitted from the arm to the plunger by means now to be described.

Attached to an ear 39 on the swinging end of the cam-arm is a socketed piece 40, forming one end of the draw-rod, the remainder of the rod being formed by the threaded rod proper, 41, and a similar socketed piece 42 at the farther end of the rod. The rod 41 is provided with right and left hand threads at its ends, so it may be secured in both socketed ends at the same time and be readily detachable therefrom, and so any slack in the rod may be taken up, and also so the throw of the plunger may be varied, as desired, the shortening of the rod increasing the travel of the plunger. The socket-piece 42 is joined to a link 43 and the link 43 to another link 44, and the latter is attached to the short arm of an elbow-lever 45, pivoted at 46 to the bottom of trunk 11. The long arm of lever 45 is connected to the plunger by a rearwardly-extending bar or link 47. A spring 48 is attached at one end to the plunger-frame, as seen at Figs. 3 and 4, and at the other end to the cross-bar 49, extending across the front end of the trunk and acts to return the plunger and its actuating devices to their normal positions, as in Figs. 2 and 3, after each baling operation.

The operation of the devices mentioned is as follows: When the sweep actuates the cam-arm 24, it causes the latter to pull the draw-rod toward the front, thereby rocking the elbow-lever and carrying its short arm downward. This throws the long arm up and back until finally it reaches the position given in Fig. 4. During this movement the lever pushes the plunger against the hay or other material in the press and compacts it into a bale and at the same time stores up power in the spring, so that the latter is prepared as soon as the roller 35 has passed off the cam-arm to return the plunger and with it the draw-rod and cam-arm to their starting positions.

A yielding folder-plate is shown at 50. It is hinged at its ends in the sides of the trunk, and on one of its axial end portions a downwardly-extending arm 51 is secured. A spring 52 acts on the arm 51 and holds the plate down to its work, and the tension of the spring may be adjusted by changing its attachment to the arm from one hole to another in the series of holes shown in the arm.

The returning-spring 48 is preferably attached to the bar 49 by means of a chain inserted in a slot 53 in the latter. The chain consists of an adjusting length or section 54 and a non-adjusting length or section 55, the links of the latter being relatively larger than those in the section 54. My purpose in this feature is to enable the user to know when he has adjusted the chain at its proper tension to secure good results. Users are apt to adjust the chain so that the spring is liable to be overexpanded and broken, and if it does not break it returns the plunger with so much force as to severely jar and rack the machine, which is very objectionable, and to prevent this overstretching of the spring I make the links in section 55 so large as to prevent their being entered in the slot 53, thereby compelling the entering of some portion of section 54 therein. The slots are so narrow also that the links of section 54 must be turned edgewise in order to enter them, and any horizontal link in that section will engage the sides of the slot, and thus resist the pull of the spring. Duplicate springs, chains, and slots may be employed, if preferred.

In order to obviate some of the jar caused by the return of the plunger, I place a buffer or cushion where it will encounter the long arm of lever 45 at the conclusion of the return movement. The buffer may be constructed in any suitable way, and I have shown one out of several constructions which may be adopted and consisting of a vertically-movable headed pin 60, passing loosely through the bottom of the trunk, and an upwardly-acting spring 61, placed under the head and around the pin.

The plunger is concaved on its acting face, as will be understood from Figs. 3, 4, and 6. This is desirable, as it obviates in large measure the tendency of the material to escape above, below, or at the sides of the plunger when the pressure becomes severe. I prefer to form this face in a single casting having raised ridges 65 on all four sides.

The inside walls of the trunk are provided at 66 with flat springs whose free ends converge and press upon the sides of the bale at its forward end. They are thus adapted to exert some friction upon the bale and to coact with the preceding bale in holding the bale while it is under process of formation against the thrust of the plunger.

At the outer end the trunk is provided with the usual vertical screws 67 at each side, whereby more or less vertical compression upon the finished bales may be caused. A curved flat spring 68 is inserted with its ends under the hand-wheels 69 of these screws and its center on top of the trunk in the customary manner, and I now reinforce the spring 68 with coiled springs 70, one under the hand-wheel of each screw, as plainly shown. These springs 70 save the necessity of screwing down the main-spring to the extent heretofore necessary, so that the life of that spring is increased.

The shaft 25 is shown as being made in one piece with the roller-arm 23 and with the cross-bar 26. The relative adjustment of the arm and bar is perfectly maintained by that construction as well as much labor saved in manufacture.

When the press is to be moved from place to place, I bring the power apparatus into close proximity to the press proper by unscrewing the rod 41 from its socketed ends and sliding the coupling-beam over the axle to the position shown in dotted lines at Fig. 1. To lock it in both its acting and its folded positions, I provide it with two openings 72, one being indicated at the center of the beam in said figure and the other being shown with a locking-pin 73 inserted in it at Figs. 3 and 4.

I have heretofore referred to the elbow-lever 45 as pivoted to the bottom of the trunk. The pivot 46 of the lever is, in fact, supported in a bearing-block 75, resting upon and bolted to the sill 74, the block being let into the floor of the trunk, as plainly shown. The stud-pivot 38 is secured in the part 32 in any suitable way—as, for instance, by the pin indicated in Figs. 3 and 4—and lock-nuts are also preferably employed on the connecting-rod 41 to lock it to the socketed pieces 42.

The cam-arm 24 is of the conformation shown in the drawings, and more particularly at Figs. 2 and 8. It has a curved acting face and is rounded off at its swinging end, so that it acts under power of the roller-arm to gradually bring the pressure to a maximum, then to gradually diminish the pressure, and finally to release the pressure suddenly. The roller-arm is located in a higher plane than the cam, and its depending rollers are consequently enabled to pass around the end of the cam.

I claim—

1. In a baling-press, a plunger having a vertical concave acting face, all parts of which are fixed, substantially as specified.

2. The combination with the plunger and its actuating mechanism, of returning-springs and the chains for adjusting them, the chains being made in sections having links of different size, substantially as specified.

3. The combination with the plunger and its actuating mechanism, of a returning-spring, a chain for adjusting the expansion of the spring, and a slotted bar receiving said chain, only the outer portion of the chain being adapted to enter the slots in the bar, substantially as specified.

4. The combination with the trunk and its compressing-screws, of the curved spring common to both screws, and a coiled reinforcing-spring for each screw, substantially as specified.

WILLIAM F. JACOBS.

Witnesses:
  M. B. SHAW,
  B. S. JORDAN.